Sept. 20, 1960 M. D. AUMANN 2,953,230
FLEXIBLE CONVEYOR CHUTE WITH ONE-PIECE LINKS
Filed Feb. 16, 1959
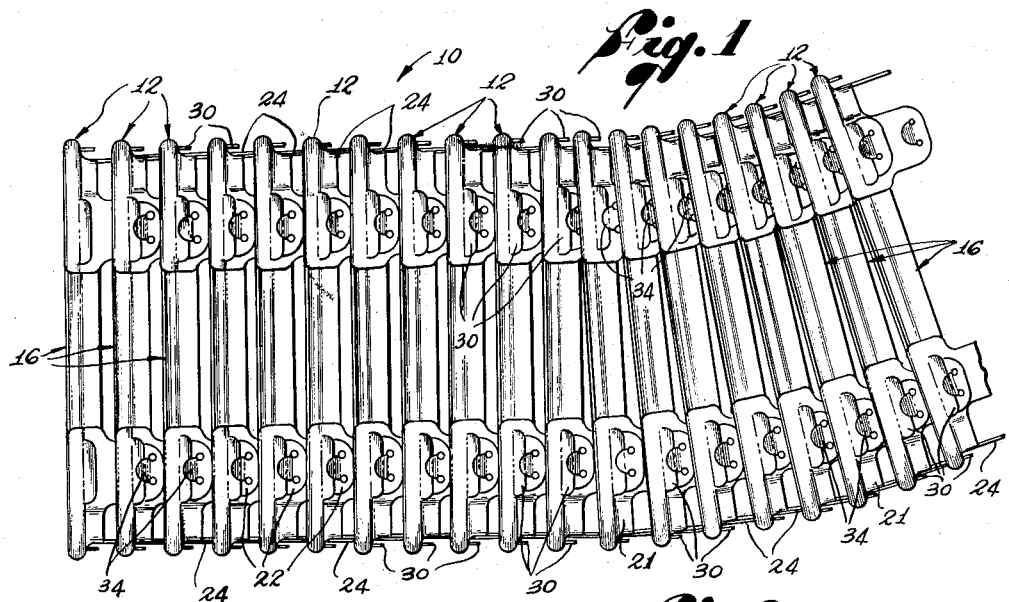
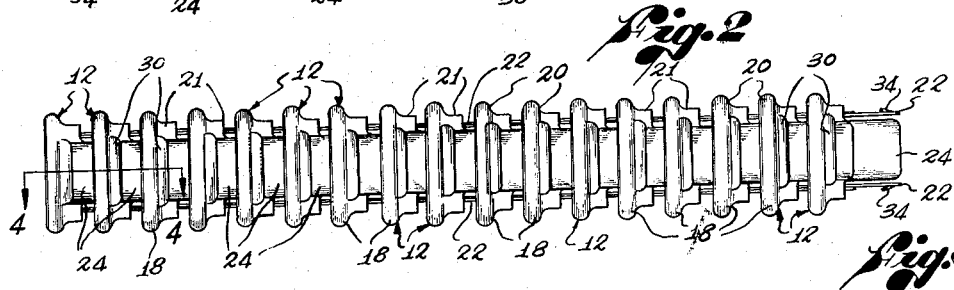
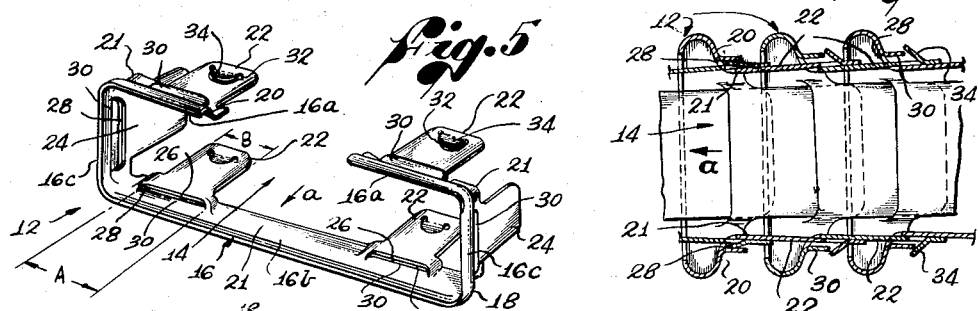
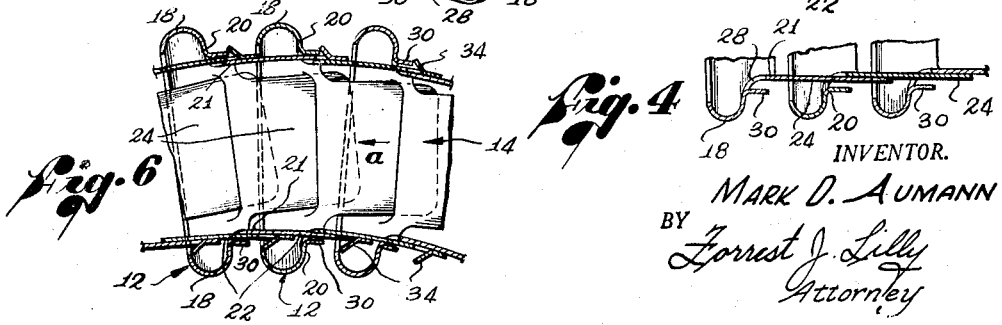
INVENTOR.
MARK D. AUMANN
BY
Forrest J. Lilly
Attorney 2,953,230
Patented Sept. 20, 1960

2,953,230

FLEXIBLE CONVEYOR CHUTE WITH ONE-PIECE LINKS

Mark D. Aumann, Fullerton, Calif., assignor to Townsend Engineered Products, Incorporated, Santa Ana, Calif., a corporation of California Filed Feb. 16, 1959, Ser. No. 793,412

3 Claims. (Cl. 193—25)

This invention relates generally to flexible conveyor chutes, and more particularly to a flexible conveyor chute of simplified design.

The individual links of most existing flexible conveyor chutes are made up of several parts which are joined in some suitable way to form an integral link. These multipiece links are costly and time consuming to fabricate and give rise to other problems in the manufacture and use of the existing conveyor chutes.

A general object of this invention is to provide a flexible conveyor chute which avoids the above-noted and other deficiencies of existing conveyor chutes of the type mentioned.

A more specific object of the invention is to provide a flexible conveyor chute in which the individual links are made from a single piece of metal.

Another object of the invention is to provide a flexible conveyor chute of the character described, the individual one-piece links of which are designed for fabrication by simple stamping and forming operations.

A further object of the invention is to provide a flexible conveyor chute in which the individual links may be simply and quickly joined and detached to initially assemble the chute and subsequently vary its length.

Yet a further object of the invention is to provide a flexible conveyor chute which is especially adapted for conveying rounds of ammunition.

A still further object of the invention is to provide a flexible conveyor chute which is extremely simple and yet rugged in construction, economical to manufacture, and otherwise especially well suited to its intended purposes and use.

Briefly, the objects of the invention are attained by providing a flexible conveyor chute having a central article passage and made up of a series of identical links, each consisting of a one-piece sheet metal frame. Each frame includes a main body of channel section which extends about the article passage in a transverse plane of the latter and a plurality of flat runners which extend lengthwise of the passage from the inner edge of one side wall of the main frame body.

The present illustrative embodiment of the conveyor chute is intended for conveying linked rounds of ammunition. For this reason, the link frames have an open, rectangular configuration similar to that of the link frames in most flexible ammunition chutes.

The side wall of each link frame, from which the runners extend, has a plurality of slots each aligned with a runner. In the assembled conveyor chute, the runners on each link extend loosely through the frame slots in an adjacent link. Certain of the runners on each link have outwardly projecting flexible locking tabs at their tip ends which are engageable with the frame of the adjacent link to limit retraction of the runners from their respective slots and yet permit flexing of the chute in fan and roll attitude as well as longitudinal extension and compression of the chute. These tabs are flexible to permit initial assembly and subsequent disassembly of the links.

The invention may be best understood from the following detailed description thereof, taken in connection with the annexed drawings, wherein:

Fig. 1 is a plan view of the present conveyor chute showing the portion of the latter flexed in fan attitude;

Fig. 2 is an edge view of the conveyor chute of Fig. 1;

Fig. 3 is an enlarged longitudinal section through several links illustrating the manner in which the latter are assembled;

Fig. 4 is an enlarged section taken along line 4—4 of Fig. 2;

Fig. 5 is an enlarged perspective view of one of the several links making up the chute of Fig. 1; and Fig. 6 is a view showing a section of the present conveyor chute flexed in roll attitude.

In these drawings, the present conveyor chute 10 will be seen to comprise a series of identical links 12 which are spaced lengthwise of the chute passage 14. A typical link 12 comprises, as shown most clearly in Fig. 5, a one-piece sheet metal frame.

This frame has a main body 16 which extends about the article passage 14 in a transverse plane of the latter. In use, articles being conveyed move through the chute in the direction indicated by the arrow $a$ in the drawings. For this reason, the forward side of the link or frame 12, as the latter is viewed in Fig. 5, is referred to herein as its trailing side and the rear side of the frame is referred to as its leading side.

As may be observed most clearly in Figs. 3, 4 and 6, the main body 16 of frame 12 has an inwardly opening channel section that lends rigidity to the link and especially to its unsupported ends or legs 16a. This main body includes an arcuate outer edge wall 18 and a leading side wall 20 which extends inwardly of the article passage 14. The main body 16 of frame 12 is completed by a flange 21 which is integrally joined to the inner edge of the side wall 20 and extends parallel to the article passage 14.

Integral with the flange 21 and extending from its leading edge are a group of four upper and lower tongues or runners 22 and a pair of end tongues or runners 24. The upper and lower runners 22 are on the long sides or legs of the body 16. End runners 24 are integral with and approximately centered lengthwise of the shorter end legs of the body.

It will be observed in Figs. 3–6 that the portion of the frame flange 21 at the base or trailing end of each runner 22 is offset inwardly of the passage 14 with respect to the adjacent portions of the flange to provide spaced guide surfaces for the articles to be conveyed. The end runners 24 and the sections of the flange 21 on the end legs of the frame are not inwardly offset in this way.

Side wall 20 of the main frame body 16, at the base or trailing end of each runner, is formed with a generally U-shaped slit 26. The overall length A of each slit, measured transversely of the adjacent runner, is slightly greater than the width B of the adjacent runner. Each slit portion is bent outwardly into approximate parallelism with the adjacent runner to form a slot 28 in the side wall 20 outwardly of and longitudinally aligned with the adjacent runner. Each slot has its innermost edge in the plane of the outer surface of the adjacent runner.

The bent out portions of the side wall 20 define a plurality of lips 30, each aligned with and spaced outwardly from the plane of the adjacent runner. These lips are approximately parallel to their adjacent runners, as shown.

The tip or leading end of each upper and lower runner 22 is also formed with a generally U-shaped slit 32.

The slit portions of the runners are bent outwardly at an acute angle to the runners to form angled, flexible locking tabs 34. These tabs extend toward the trailing or base ends of the runners.

The end runners 24 are flat and unslit and have no locking tabs.

As mentioned earlier, the several links or frames 12 of the conveyor chute 10 are identical. Thus, when several links are placed side-by-side and aligned, the runners on one link will be aligned with the slots in an adjacent link. The links are assembled to form a conveyor chute by inserting the runners on each link through the aligned slots in the adjacent link, as shown most clearly in Figs. 3, 4 and 6.

During insertion of the tips of the upper and lower runners 22 through the adjacent frame slots, the locking tabs 34 thereon are depressed, as illustrated at the left-hand end of Fig. 3. Upon complete insertion of the runners to the positions illustrated at the right-hand end of Fig. 3, the tabs snap outwardly behind the adjacent lips 30 to lock the links against separation. The links may, however, be easily detached by simply pressing the locking tabs inwardly until they clear the lips 30 so as to permit the runners on the one link to be withdrawn from the slots in the adjacent link.

In the assembled chute, the runners 22 and 24 on successive links are disposed in overlapping fashion, as shown in Figs. 3–5, and provide article guiding surfaces in the central passage of the chute. The several links of the chute will be seen to be loosely interconnected by the runners so as to render the chute capable of flexing in roll and fan attitude as well as longitudinal extension and compression. Moreover, angular deflection or twisting of the individual frame bodies about the longitudinal axis of their long legs 16b allows adjacent links to be relatively rotated or twisted about the longitudinal axis of the chute so that the latter may assume an attitude of helical twist.

Fig. 6 is a section through the chute when flexed in roll attitude, for example.

The illustrated conveyor chute is especially designed for conveying linked rounds of ammunition. For this reason, the link frames 12 have an open, rectangular construction in which the space between the legs 16a of the link frames permits manual feeding of a belt of ammunition through the chute. The chute may, however, be used to convey other articles and the link frames may have other than rectangular shapes.

It is evident that the single-piece link frames 12 may be easily and inexpensively produced by simple stamping and forming operations. Also, the finished links may be readily assembled to form a conveyor chute. Clearly, therefore, there has been described and illustrated a conveyor chute which is fully capable of attaining the objects and advantages preliminarily set forth.

While a preferred form of the invention has been described and illustrated, it is obvious that numerous modifications thereof are possible within the scope of the following claims.

I claim:

1. A flexible conveyor chute having a central article passage, comprising a series of identical links spaced lengthwise of said passage and each consisting of a one-piece sheet metal frame including a main body which extends about said passage in a transverse plane of the latter and a plurality of flat runners which extend approximately parallel to said passage from one side of said body, said body having at said one side a side wall that extends inwardly toward said passage and said runners being integrally joined at one end to the inner edge of said side wall, said side wall having a slot at said one end of and parallel to each runner and a lip along the outermost edge of each slot that extends in the same direction as the adjacent runner, the length of each slot being slightly greater than the width of its adjacent runner, and the innermost edge of each slot being approximately coplanar with the outer surface of its adjacent runner, the other ends of said runners of each link extending through the aligned slots in an adjacent link, and a flexible tab bent outwardly at an acute angle from said other end of runners on each link for engaging the proximate lip on the adjacent link to limit retraction of the runners on each link from the slots in the adjacent link.

2. A flexible conveyor chute having a central article passage through which articles are adapted to move in a given direction, comprising a series of identical links spaced lengthwise of said passage and each consisting of a one-piece frame including a side wall in a transverse plane of said passage, an edge wall along the outer edge of and extending in said direction from the side wall, a flange along the inner edge of and extending in the opposite direction from the side wall parallel to the passage, and a plurality of flat runners integrally joined to and extending in said opposite direction from the edge of said flange, said side wall having a slot aligned with and parallel to each runner, the length of each slot being slightly greater than the width of its adjacent runner and the innermost edge of each slot being approximately coplanar with the outer surface of its adjacent runner, the other ends of said runners of each link extending through the aligned slots in an adjacent link, and means on and integral with said other ends of the runners on each link engageable with the adjacent link to limit retraction of the runners on each link from the slots in the adjacent link.

3. A flexible conveyor chute having a central article passage through which articles are adapted to move in a given direction, comprising a series of identical links spaced lengthwise of said passage and each consisting of a one-piece frame including a side wall in a transverse plane of said passage, an edge wall along the outer edge of and extending in said direction from the side wall, a flange along the inner edge of and extending in the opposite direction from the side wall parallel to the passage, and a plurality of flat runners integrally joined to and extending in said opposite direction from the edge of said flange, said side wall having a slot aligned with and parallel to each runner, a lip along the outer edge of each slot extending in said opposite direction from the side wall, the length of each slot being slightly greater than the width of its adjacent runner and the innermost edge of each slot being approximately coplanar with the outer surface of its adjacent runner, the free ends of said runners of each link extending through the aligned slots in an adjacent link, and a flexible tab bent outwardly at an acute angle from each runner adjacent its free end for engaging the lip along the outer edge of the slot through which the respective runner extends for limiting separation of adjacent links.

References Cited in the file of this patent

UNITED STATES PATENTS

| | | |
|---|---|---|
| 2,378,652 | Nobles et al. | June 19, 1945 |
| 2,890,779 | Aumann | June 16, 1959 |